US012279097B2

(12) United States Patent
Sai et al.

(10) Patent No.: US 12,279,097 B2
(45) Date of Patent: Apr. 15, 2025

(54) VIBRATION PLATE AND METHOD FOR MANUFACTURING VIBRATION PLATE

(71) Applicant: Foster Electric Company, Limited, Tokyo (JP)

(72) Inventors: Yusuke Sai, Tokyo (JP); Hirotsugu Nakayama, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 254 days.

(21) Appl. No.: 17/995,348

(22) PCT Filed: Mar. 31, 2021

(86) PCT No.: PCT/JP2021/014051

§ 371 (c)(1),
(2) Date: Oct. 3, 2022

(87) PCT Pub. No.: WO2021/201180

PCT Pub. Date: Oct. 7, 2021

(65) Prior Publication Data

US 2023/0156420 A1 May 18, 2023

(30) Foreign Application Priority Data

Apr. 2, 2020 (JP) ................................ 2020-066461

(51) Int. Cl.
*H04R 31/00* (2006.01)
*H04R 7/12* (2006.01)

(52) U.S. Cl.
CPC ........... *H04R 31/003* (2013.01); *H04R 7/125* (2013.01); *H04R 2307/021* (2013.01); *H04R 2499/13* (2013.01)

(58) Field of Classification Search
CPC .................. H04R 31/003; H04R 7/125; H04R 2307/021; H04R 2499/13
See application file for complete search history.

(56) References Cited

U.S. PATENT DOCUMENTS 6,670,402 B1 * 12/2003 Lee ...................... B01J 13/0091 501/12
8,002,079 B2 * 8/2011 Funahashi ............ H04R 31/003 181/170
(Continued)

FOREIGN PATENT DOCUMENTS

JP 60-148295 8/1985
JP S62-108698 A 5/1987
(Continued)

OTHER PUBLICATIONS

Japanese Patent Office; International Search Report and Written Opinion for PCT/JP2021/014051; Jun. 29, 2021; entire document.
(Continued)

*Primary Examiner* — Forrest M Phillips
(74) *Attorney, Agent, or Firm* — ALLEN, DYER, DOPPELT & GILCHRIST, P.A.

(57) ABSTRACT

A diaphragm for an electroacoustic transducer includes a paper substrate containing cellulose fibers as a main component and is configured such that a first surface region with a predetermined thickness from a first surface of the paper substrate has a greater total amount of coloring particles than a second surface region with a predetermined thickness from a second surface of the paper substrate, the second surface being opposite to the first surface.

12 Claims, 5 Drawing Sheets

(56) References Cited

U.S. PATENT DOCUMENTS

| | | | | |
|---|---|---|---|---|
| 8,340,342 | B2 * | 12/2012 | Jin | H04R 7/02 523/223 |
| 11,019,443 | B2 * | 5/2021 | Yoshioka | H04R 9/06 |
| 2004/0026164 | A1 * | 2/2004 | Takahashi | H04R 7/20 181/171 |
| 2007/0148353 | A1 * | 6/2007 | Mizone | C09D 11/10 427/256 |
| 2020/0404412 | A1 | 12/2020 | Akiyama et al. | |

FOREIGN PATENT DOCUMENTS

| | | | |
|---|---|---|---|
| JP | 2016-051991 | A | 4/2016 |
| JP | 2017103632 | A | 6/2017 |
| JP | 2017126881 | A | 7/2017 |
| WO | WO2019172076 | A1 | 9/2019 |

OTHER PUBLICATIONS

Supplemental Partial European Search Report; European Patent Office; Search Report for PCT/JP2021/014051; Aug. 22, 2023; entire document.

* cited by examiner

VIBRATION PLATE AND METHOD FOR MANUFACTURING VIBRATION PLATE

CROSS-REFERENCE TO RELATED APPLICATIONS

This application is the § 371 National Stage Entry of International Application No. PCT/JP2021/014051, filed on Mar. 31, 2021, which claims the benefit of Japanese Patent Application No. JP2020-066461, filed on Apr. 2, 2020, the contents of which applications are herein incorporated by reference in their entirety.

FIELD OF THE INVENTION

The present disclosure relates to a diaphragm for an electroacoustic transducer, used for a speaker, a microphone, or other devices, and a method of manufacturing the diaphragm.

BACKGROUND OF THE INVENTION

Diaphragms for an electroacoustic transducer are generally required to have a low density, a high Young's modulus, an appropriate internal loss, and other characteristics. For such diaphragms, a material with physical properties most suitable for usage of a speaker or a microphone is selected as appropriate. In particular, cellulose fibers are widely employed because they are inexpensive and lightweight and exhibit excellent performance as a diaphragm due to their appropriate internal loss.

Because the diaphragm appears on an exterior of a speaker, the diaphragm may be colored for aesthetic purposes. For coloring cellulose fibers as a material of a diaphragm, a technique in which a direct dye is used as in Patent Document 1 has been known. Coloring with a direct dye is advantageous in that easy dyeing of the diaphragm, good color development, and a light weight of the diaphragm can be attained at low cost.

CITATION LIST

Patent Document

Patent Document 1: Japanese Unexamined Patent Publication No. S60-148295.

However, a diaphragm colored with a direct dye has a problem in weather resistance such as being easily discolored when exposed to direct sunlight. One conceivable countermeasure is using a sulfur dye, which is a dye with a high weather resistance, but the use of a sulfur dye would possibly embrittle the cellulose fibers.

As an alternative, there is a known technique of coloring with a pigment instead of a direct dye. However, such pigments tend to be inferior to direct dyes in terms of color development when coloring cellulose fibers. Thus, coloring with a pigment has a difficulty in achieving color development equivalent to that of the direct dye in the same amount. One conceivable countermeasure is increasing the amount of a pigment to use. However, this would be result in an increase in the weight of the entire diaphragm or a change in the physical properties of the diaphragm, which would degrade the diaphragm in electroacoustic conversion characteristics The present disclosure was made to solve at least some of such problems. It is an object of the present disclosure to provide a diaphragm, for an electroacoustic transducer, with a higher weather resistance.

SUMMARY OF THE INVENTION

In order to achieve the object, a diaphragm for an electroacoustic transducer, including a paper substrate containing cellulose fibers as a main component, wherein: the paper substrate has a first surface region and a second surface region opposite to the first surface, the first surface region has a predetermined thickness from a first surface of the paper substrate, the second surface region has a predetermined thickness from a second surface, and the first surface region contains a greater total amount of coloring particles than the second surface region.

Moreover, the coloring particles may have an average particle size of 700 nm or less.

Moreover, the coloring particles may have an average particle size of 400 nm or less.

Moreover, the paper substrate may be a paper substrate dyed with a direct dye.

Moreover, the coloring particles may be carbon black.

Moreover, the first surface region may have a thickness of at least one tenth of a thickness of the paper substrate.

The total amount of the coloring particles in the first surface region may be twice or more than in the second surface region.

The paper substrate may be substantially in a cone shape with a back surface being the second surface of the paper substrate.

The diaphragm may be for use in an on-vehicle speaker.

In order to achieve the object, the present disclosure is directed to a method of manufacturing a diaphragm for an electroacoustic transducer, the diaphragm including a paper substrate containing cellulose fibers as a main component, the method including: impregnating, with a coloring, the paper substrate containing cellulose fibers as a main component, the coloring being a dispersion in which coloring particles are dispersed in a solvent; and drying the paper substrate impregnated with the coloring, the drying including drying the paper substrate in such a way that a vapor pressure of the solvent in a space in contact with a second surface of the paper substrate is greater than in a space in contact with a first surface of the paper substrate, the second surface being opposite to the first surface, so that a first surface region with a predetermined thickness from the first surface of the paper substrate will have a greater total amount of the coloring particles than a second surface region with a predetermined thickness from the second surface.

As described above, the present disclosure provides a diaphragm, for an electroacoustic transducer, with a higher weather resistance.

DETAILED DESCRIPTION OF PREFERRED EMBODIMENTS

A diaphragm for an electroacoustic transducer according to one embodiment of the present disclosure will be described below.

Figure 1:
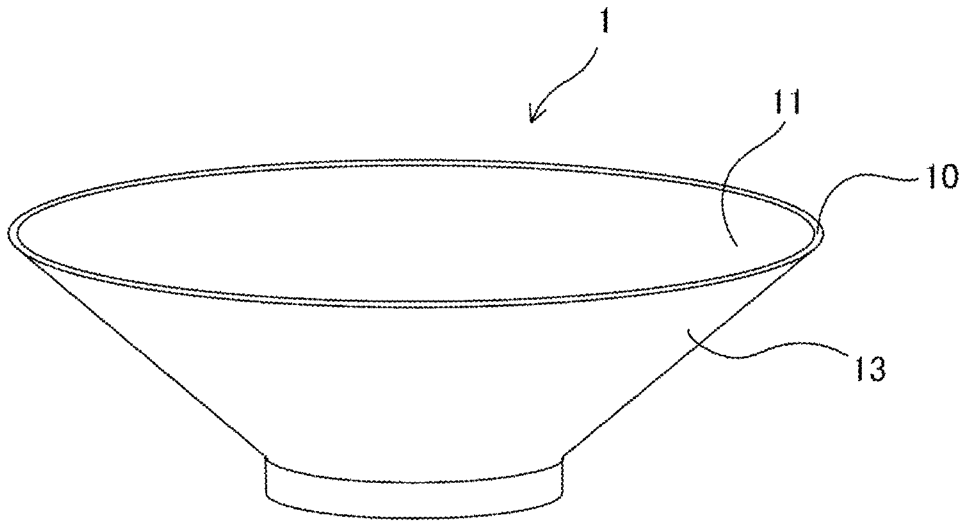
FIG. 1 is a perspective view of a diaphragm for an electroacoustic transducer according to one embodiment of the present disclosure.
Figure 2:
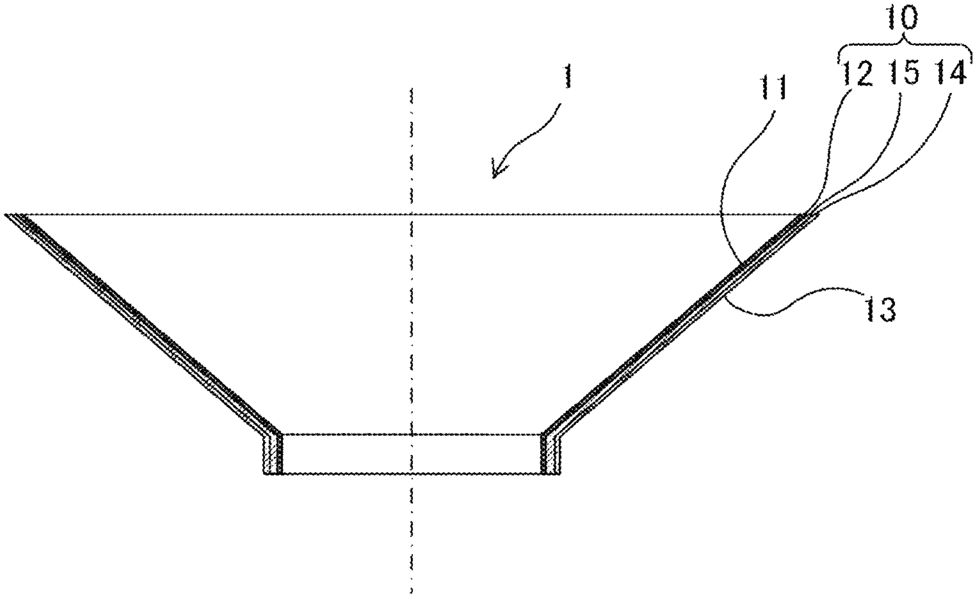
FIG. 2 is a cross-sectional view of the diaphragm for an electroacoustic transducer according to the embodiment of the present disclosure.
Figure 3:
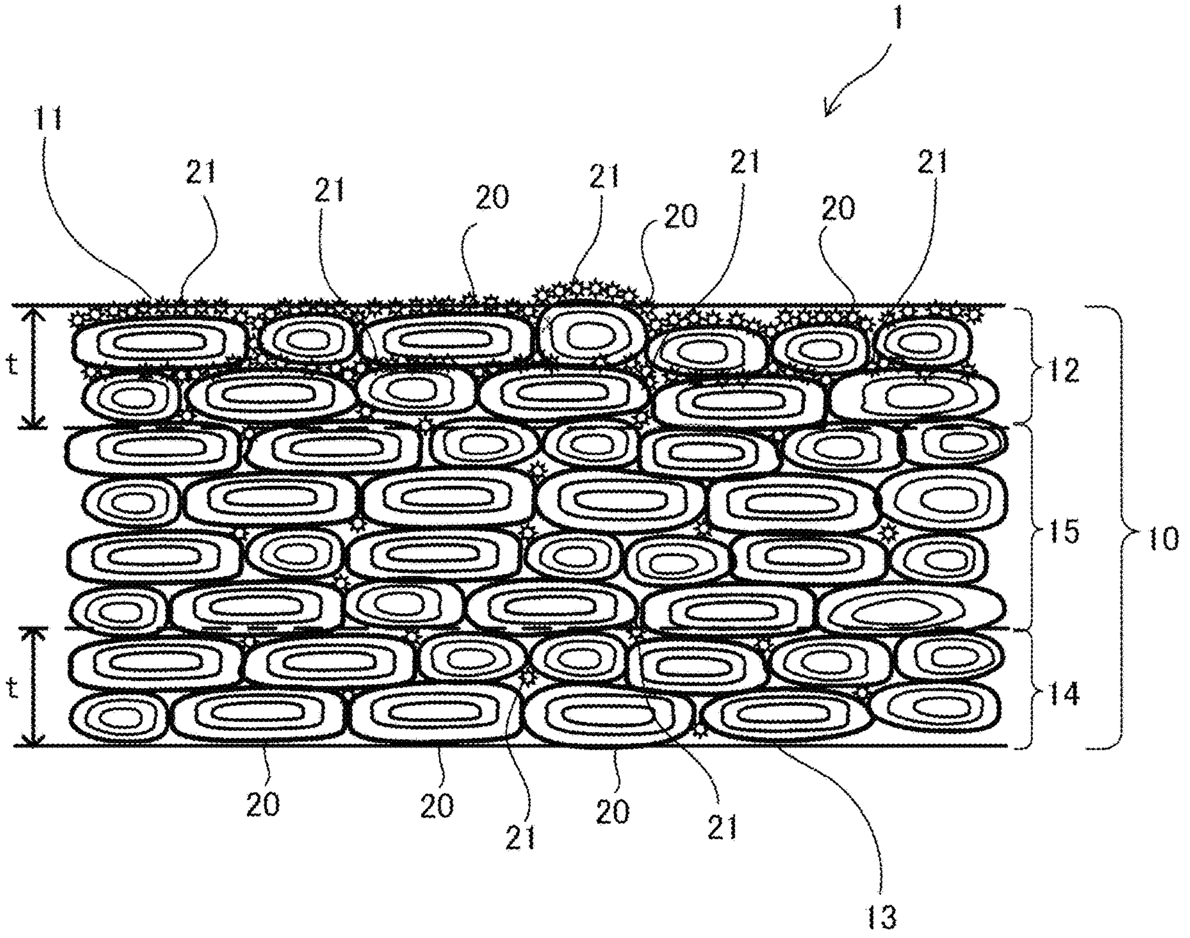
FIG. 3 is a schematic cross-sectional view of the diaphragm for an electroacoustic transducer according to the embodiment of the present disclosure.
Figure 4:
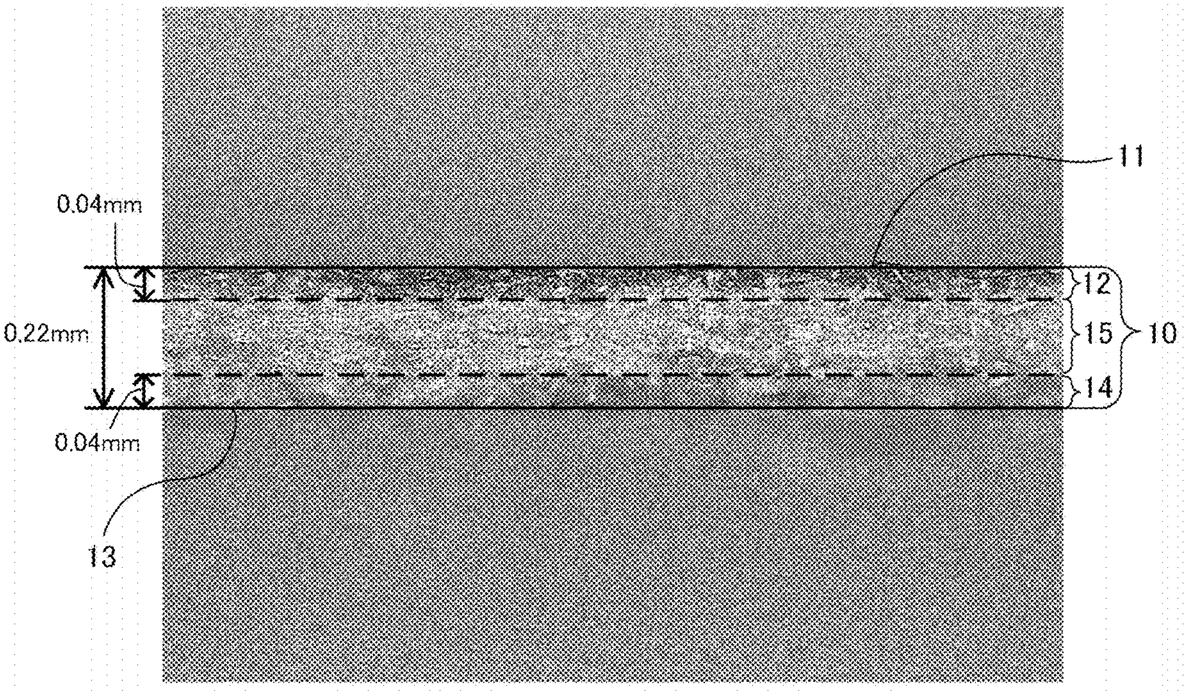
FIG. 4 is an optical micrograph showing a cross-section of the diaphragm for an electroacoustic transducer according to the embodiment of the present disclosure.

FIG. 1 is a perspective view of the diaphragm for an electroacoustic transducer according to the embodiment of the present disclosure. FIG. 2 is a cross-sectional view thereof. FIG. 3 is a schematic cross-sectional view of the diaphragm for an electroacoustic transducer according to the embodiment of the present disclosure. FIG. 4 is an optical micrograph thereof.

A diaphragm 1 illustrated in illustrated in FIGS. 1 and 2 is for a speaker (electroacoustic transducer) and in a truncated cone shape (in a substantially cone shape). The diaphragm 1 is configured such that a vibration source (not shown), such as a voice coil, of the speaker will be attached to that side of the diaphragm 1 which is opened with a smaller diameter. Electrification of the voice coil causes the diaphragm 1 to vibrate, and the diaphragm 1 thus vibrating vibrates the air to radiate sound. In other words, electroacoustic conversion can be performed in this way. A cone part of this diaphragm 1 has an inner surface which serves as a sound radiation surface and a surface (a first surface 11) visible externally. On the other hand, the cone part of the diaphragm 1 has an outer surface, that is, the back surface (a second surface 13) behind which various devices (not shown) of a speaker will be provided.

The diaphragm 1 includes a paper substrate 10 that is made from a fiber material mainly containing cellulose fibers.

More specifically, the paper substrate 10 is obtainable by treating the cellulose fibers (fiber material) 20 with a beating process to a freeness not less than 10° SR (Schopper Riegler) but not more than 50° SR, and preparing a solution of the cellulose fibers thus treated, and making paper for a diaphragm shape from the solution. The cellulose fibers 20 in this embodiment are pulp mainly made from conifers. In addition, the cellulose fibers 20 may be made from wood pulp or non-wood pulp such as kenaf, a mixture of other wood pulp and non-wood pulp, wood pulp alone, or non-wood pulp alone. The cellulose fibers 20 may have an average fiber size (maximum width) not less than 5 μm but not more than 90 μm, preferably. Note that the cellulose fibers 20 are not particularly limited in terms of fiber lengths, and cellulose fibers with fiber lengths generally applicable in papermaking may be selected as the cellulose fibers 20 as appropriate.

Here, the explanation will be based on assumption that the paper substrate 10 includes a first surface region 12, an intermediate region 15, and a second surface region 14 along its thickness as in FIGS. 2 to 4. The paper substrate 10 is such that the entire cellulose fibers 20 thereof are dyed with a direct black dye (e.g., Direct Black 19). As illustrated in the schematic view of FIG. 3, the paper substrate 10 contains a pigment (which is coloring particles 21) on and between the cellulose fibers 20. The pigment may be carbon black, for example. The coloring particles 21 may preferably have an average particle size of 700 nm or less in view of color development. This is because the coloring particles 21 large in particle size would result in less chromogenic properties. In addition, the coloring particles 21 small in particle size easily move between the cellulose fibers 20 in a drying step, which will be described later. Accordingly, it is preferable that the coloring particles 21 have an average particle size of 400 nm or less. It should be noted that, for easier understanding of the relationship between the cellulose fibers 20 and the coloring particles 21, FIG. 3 exaggerates the respective elements, compared with the actual sizes.

As illustrated in FIG. 3, the first surface region 12 with a thickness t from the first surface 11 contains a greater amount of the coloring particles 21 than the second surface region 14 with the same thickness t from the second surface 13. That is, a total amount of the coloring particles 21 contained in the first surface region 12 is greater than a total amount of the coloring particles 21 in the second surface region 14, where the first surface region 12 is a region with a thickness t from the first surface 11 and the second surface region 14 is a region with the thickness t from the second surface 13, presuming that the respective coloring particles 21 have the same mass. Moreover, for the intermediate region 15 between the first surface region 12 and the second surface region 14, the first surface region 12 contains a greater amount of the coloring particles 21 than the intermediate region 15, assuming that the intermediate region 15 between the first and second surface regions 12 and 14 is also defined with the same thickness t, that is, the first surface, second surface, and intermediate regions 12, 14, and 15 are all defined with the same thickness. That is, the first surface region 12 contains a greater total amount of the coloring particles 21 than a portion with the thickness t in the intermediate region 15.

FIG. 4 is an optical micrograph showing a cross-section of the paper substrate 10 of the diaphragm 1. For easier understanding of the coloring conditions with the coloring particles 21, FIG. 4 shows the paper substrate 10 colored not with a direct dye but only with carbon black (i.e., the coloring particles 21). As shown in FIG. 4, the paper substrate 10 has a total thickness of approximately 0.22 mm. It can be seen in the paper substrate 10 that the first surface region 12 with a thickness of 0.04 mm from the first surface 11 is colored black and deeply colored with the coloring particles 21. The first surface region 12 has a thickness of at least one tenth of the thickness of the paper substrate 10, which is 0.22 mm here. The second surface region 14 of the paper substrate 10 has a lighter black color than the first surface region 12. The intermediate region 15 also has a lighter black color than the first surface region 12. This indicates the fact that the first surface region 12 contains a greater amount of the coloring particles 21 than the second surface region 14 as described above. That is, the first surface region 12 contains a higher total amount of the coloring particles 21 than the second surface region 14. The difference between the total amounts of the coloring particles 21 in the first surface region 12 and the second surface region 14 is at least twice or more. The amounts of the coloring particles 21 in the regions in the paper substrate 10 may be worked out from an image obtained by a scanning electron microscope (SEM) or other means based on an amount or density of the coloring particles 21 observed in a predetermined region.

As described above, the diaphragm 1 of the present disclosure is configured such that the paper substrate 10 is provided with more coloring particles 21 locally in the first surface region 12. This configuration results in that the amount of the coloring particles 21 provided to the paper substrate 10 is reduced but the amount of the coloring particles 21 located on the front surface of the paper substrate 10 is increased, thereby facilitating prevention of color unevenness on the front surface of the diaphragm 1 while improving blackness of the front surface of the diaphragm 1.

Compared with direct dyes such as Direct Black 19, the carbon black as the coloring particles 21 is tolerant to color-change-causing light irradiation, particularly by ultraviolet irradiation and thus retards color fading. Accordingly, a high weather (light) resistant diaphragm can be provided with such a feature that a color change by color fading is retarded in the diaphragm 1, where the first surface 11 is observed.

The use of a smaller amount of carbon black leads to a weight reduction of the diaphragm and reduces deterioration in the electroacoustic conversion characteristics caused by a change in the physical properties of the diaphragm 1, that is, reduces deterioration in sound quality. The use of a smaller amount of carbon black also achieves cost reduction. In addition, a greater amount of the coloring particles 21 on the first surface 11 of the paper substrate 10 increases the resistance of the diaphragm 1 to weather, namely light so that the diaphragm 1 is advantageously applicable to an on-vehicle speaker, which requires an environmental resistance.

The paper substrate 10 of the diaphragm 1 of the present disclosure is dyed with a direct dye and thus achieves development of darker black and reduces color unevenness as compared to the case colored only with carbon black. In addition, the carbon black localized in the first surface region 12 absorbs or reflects ultraviolet or other rays, thereby allowing less ultraviolet or other rays to enter the paper substrate 10 and reducing the color fading of the direct dye.

Manufacturing Method

Next, a manufacturing process of the diaphragm for an electroacoustic transducer according to an example of the present disclosure will be described. An example will be described below using Direct Black 19 as a direct dye and carbon black as coloring particles.

First, cellulose fibers (a fiber material) 20 colored with a direct dye added thereto are prepared as a solution, and paper is made in a diaphragm shape from the solution, and the paper is dried to form a paper substrate 10.

Next, the entire paper substrate 10 is impregnated with a dispersion as a coloring for approximately five to ten seconds (impregnating step). The dispersion is such that carbon black, which is the coloring particles, is dispersed in ethyl acetate, which is an organic solvent. The coloring in this example is ethyl acetate solution adjusted to contain 1 wt % to 5 wt % of carbon black. After that, the paper substrate 10 impregnated with the coloring is dried (drying step) to dry off ethyl acetate. In this way, the paper substrate 10 is colored.

In the drying step, ethyl acetate is dried off in such a way that vapor pressure of ethyl acetate is greater in a space in contact with the second surface 13 of the paper substrate 10 than in a space in contact with the first surface 11 of the paper substrate 10. More specifically, the space in contact with the first surface 11 and the space in contact with the second surface 13 are physically separated by a jig or other means, so that the space in contact with the first surface 11 becomes an open space (or a substantially open space), while the space in contact with the second surface 13 becomes a closed space (or a substantially closed space). The space in contact with the second surface 13 is smaller than the space in contact with the first surface 11. By drying the paper substrate 10 in this state, it is possible to ensure that the vapor pressure of the ethyl acetate reaches a saturated vapor pressure earlier in the space in contact with the second surface 13, while the vapor pressure of the ethyl acetate is kept relatively lower in the space in contact with the first surface 11. Therefore, ethyl acetate, which is the solvent of the coloring used to impregnate the entire paper substrate 10, is thus actively volatilized from the first surface 11. Accordingly, ethyl acetate moves in the direction from the second surface 13 to the first surface 11 within the paper substrate 10. Along with the movement of ethyl acetate, the carbon black also moves in the direction from the second surface 13 to the first surface 11. As a result of this, after ethyl acetate is dried off, the amount of the carbon black in the first surface region 12 of the paper substrate 10 becomes greater than in the second surface region 14.

Here, a Comparative Example will be described where the paper substrate 10 is dried by drying off the solvent from both surfaces without being physically divided into the space in contact with the first surface 11 and the space in contact with the second surface 13. In the Comparative Example, since ethyl acetate volatilizes from both the first and second surfaces 11 and 13, the carbon black also moves to both the first and second surface regions 12 and 14.

Figure 5:
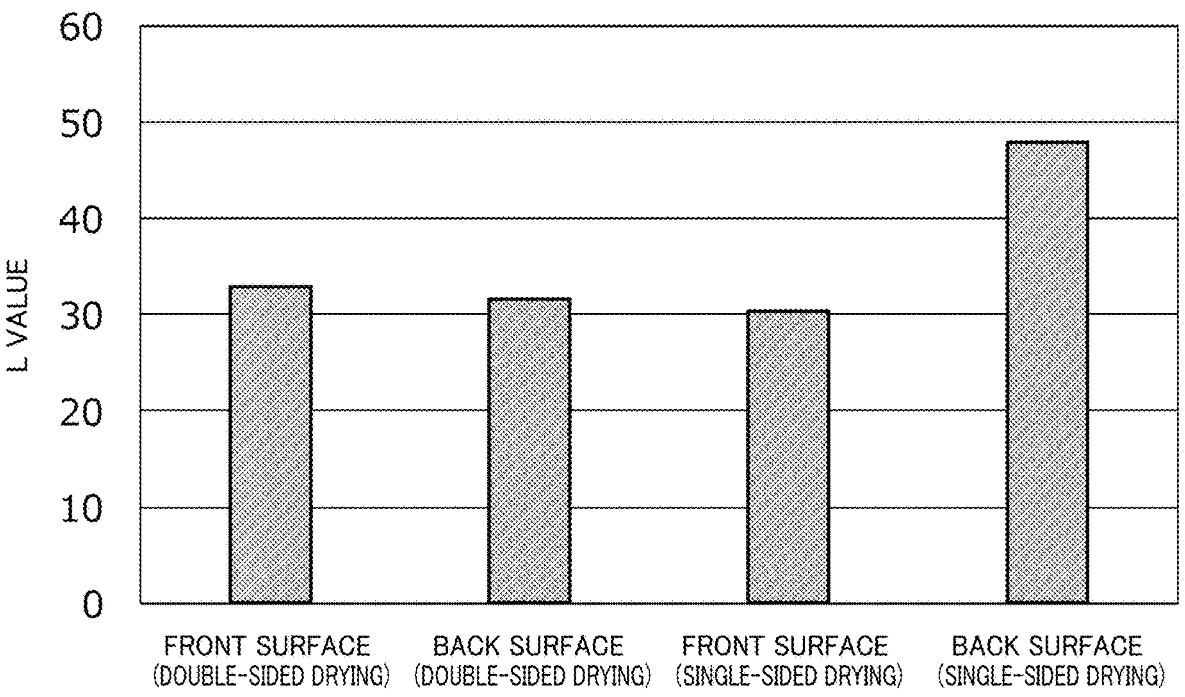
FIG. 5 is a graph illustrating an L value of diaphragms for an electroacoustic transducer dried against different drying conditions.

FIG. 5 is a graph showing L values on the first surface (front surface) and the second surface (back surface) of the diaphragms produced by the drying method (single-sided drying) in Example and the drying method (double-sided drying) in Comparative Example of the present disclosure. An L value is a value defining the lightness of the color of a substance and an index represented by a numerical value between 0 and 100. An L value of 100 indicates white. With a decrease in the L value, the color becomes darker. An L value of 0 indicates black. The paper substrate 10 whose L value was measured and shown in FIG. 5 was colored not with a direct dye but only with carbon black as the coloring particles for more clearly showing the difference in the L value caused by the difference in the drying methods.

The paper substrate 10 subjected to the double-sided drying in Comparative Example has L values of approximately 33 on the front surface and approximately 32 on the back surface. By contrast, the paper substrate 10 subjected to the single-sided drying in Example of the present disclosure has L values of approximately 30 on the front surface and approximately 48 on the back surface. Comparative Example has almost no difference in the L value between the front and back surfaces. On the other hand, it can be seen in the Example that the front surface has a smaller L value than the back surface and thus has a darker black color with a greater amount of carbon black.

As described above, the method of manufacturing a diaphragm according to the Example of the present disclosure causes the first surface region 12 to contain a greater amount of the coloring particles 21 than the second surface region 14. That is, the method of manufacturing a diaphragm according to the Example of the present disclosure can produce such a configuration that the first surface region 12 has a higher total amount of the coloring particles 21 than the second surface region 14. The impregnating step of impregnating the paper substrate 10 with the coloring is not limited as to how to apply or impregnate the coloring, and may be carried out by spraying the coloring onto the surface of the paper substrate 10, by dripping and spreading the coloring on the front or back surface of the paper substrate 10, or by directly applying and spreading the coloring on the surface of the paper substrate 10 by use of a brush or other means. The drying, in which the vapor pressure of the solvent is controlled in the spaces in contact with the first surface 11 and the second surface 13 of the paper substrate 10, can easily provide the coloring particles 21 with uniformity on the entire surface (first surface 11) of the diaphragm 1. When the amount of the coloring particles 21 in the first surface region 12 increases to reach a certain density or more, the apparent blackness of the first surface 11 is saturated and will not change any more. Since the coloring particles 21 can be more concentrated on one surface (i.e., the front surface) by the single-sided drying, the single-sided drying ensures that the coloring particles on the entire surface have a certain density or more, thereby facilitating avoidance of color unevenness. The use of an organic solvent as the solvent of the coloring ensures quick drying properties at the drying, thereby making it possible to reduce a process working time.

While the Example described above is such that ethyl acetate is employed as the solvent, other solvents may be used. In addition, the coloring may be prepared, for example, by providing a hydrophilic group such as a hydroxyl group on the surface of coloring particles such as carbon black and preparing a dispersion using water as a solvent.

As described above, the diaphragm 1 of the present disclosure for an electroacoustic transducer includes the paper substrate 10 containing the cellulose fibers 20 as a main component and is configured such that the first surface region 12 with a predetermined thickness from the first surface 11 of the paper substrate 10 has a higher total amount of the coloring particles 21 than the second surface region 14 with a predetermined thickness from the second surface 13 of the paper substrate 10, the second surface 13 being opposite to the first surface 11.

The pigment as the coloring particles 21 is tolerant to color-change-causing light irradiation, particularly by ultraviolet irradiation and thus retards color fading, compared with the direct dyes. Accordingly, the diaphragm 1 can be provided with an improved weather resistance that the color change due to color fading is retarded in the diaphragm 1, where the first surface 11 is observed.

While the example described above is such that carbon black, which is a black pigment, is employed as the coloring particles, the coloring particles are not limited thereto. The coloring particles may be color pigments containing inorganic or organic pigments, such as white pigments such as zinc white, white lead, titanium dioxide, and blanc fixe, red pigments such as red lead, red iron oxide, brilliant carmine, and quinacridone red, yellow pigments such as chrome yellow, zinc yellow, and disazo yellow, and blue pigments such as ultramarine blue, potassium ferrocyanide, and phthalocyanine blue, or may be pigments other than these. The color tone of the direct dye for dyeing the paper substrate 10 may be selected in accordance with the color tone of the pigment.

The dyeing of the paper substrate 10 with a direct dye is not necessarily required and can be selected as appropriate in accordance with the required specifications of the speaker using the diaphragm 1.

The coloring may be a dispersion prepared by mixing the coloring particles 21, nitrocellulose, and a solvent together. With this configuration, after the solvent is dried off, a film (coating film) of nitrocellulose is formed on the first surface 11 of the paper substrate 10. This increases the fixability of the coloring particles 21 to the paper substrate 10. In addition, this can give glossiness to the first surface 11 of the diaphragm 1. Instead of nitrocellulose, a polymer substance such as a drying oil, a natural resin, a synthetic resin, or a cellulose derivative may be employed.

The present disclosure is not limited to the embodiment described so far.

Even though the embodiment above is described such that the cone part of the diaphragm 1 has the inner surface as the first surface 11 and the outer surface as the second surface, but the outer surface of the cone part may be configured as the first surface 11, so that the first surface region 12 on the outer surface of the cone part contains a greater amount of the coloring particles 21. Even though the embodiment above is such that the diaphragm 1 is substantially in a cone shape, the diaphragm may be in another shape.

DESCRIPTION OF REFERENCE CHARACTERS

1. Diaphragm
10. Paper Substrate.
11. First Surface
12. First Surface Region
13. Second Surface
14. Second Surface Region
15. Intermediate Region
20. Cellulose Fibers (Fiber Material)
21. Coloring Particles

The invention claimed is:

1. A diaphragm for an electroacoustic transducer, the diaphragm comprising a paper substrate containing cellulose fibers as a main component;

wherein the paper substrate has a first surface region and a second surface region opposite to the first surface, the first surface region has a predetermined thickness from a second surface, the first surface region and the second surface region contain coloring particles, and the first surface region contains a greater total amount of coloring particles than the second surface region.

2. The diaphragm of claim 1, wherein the coloring particles have an average particle size of 700 nm or less.

3. The diaphragm of claim 1, wherein the coloring particles have an average particle size of 400 nm or less.

4. The diaphragm of claim 1, wherein the paper substrate is a paper substrate dyed with a direct dye.

5. The diaphragm of claim 1, wherein the coloring particles are carbon black.

6. The diaphragm of claim 1, wherein the first surface region has a thickness of at least one tenth of a thickness of the paper substrate.

7. The diaphragm of claim 1, wherein the total amount of the coloring particles in the first surface region is twice or more than in the second surface region.

8. The diaphragm of claim 1, wherein the paper substrate is substantially in a cone shape with a back surface being the second surface of the paper substrate.

9. The diaphragm of claim 1, wherein the diaphragm is for use in an on-vehicle speaker.

10. The diaphragm of claim 4, wherein the coloring particles are carbon black.

11. The diaphragm of claim 6, wherein the total amount of the coloring particles in the first surface region is twice or more than in the second surface region.

12. A method of manufacturing a diaphragm for an electroacoustic transducer, the diaphragm including a paper substrate, the method comprising:

impregnating, with a coloring, the paper substrate containing cellulose fibers as a main component, the coloring being a dispersion in which coloring particles are dispersed in a solvent; and drying the paper substrate impregnated with the coloring, the drying including drying the paper substrate in such a way that a vapor pressure of the solvent in a space in contact with a second surface of the paper substrate is greater than in a space in contact with a first surface of the paper substrate, the second surface being opposite to the first surface, so that a first surface region with a predetermined thickness from the first surface of the paper substrate will have a greater total amount of the coloring particles than a second surface region with a predetermined thickness from the second surface.

* * * * *